Sept. 8, 1925.  H. B. DODGE  1,553,147
UNITARY REVERSING AND DIFFERENTIAL STRUCTURE
Filed Sept. 26, 1923
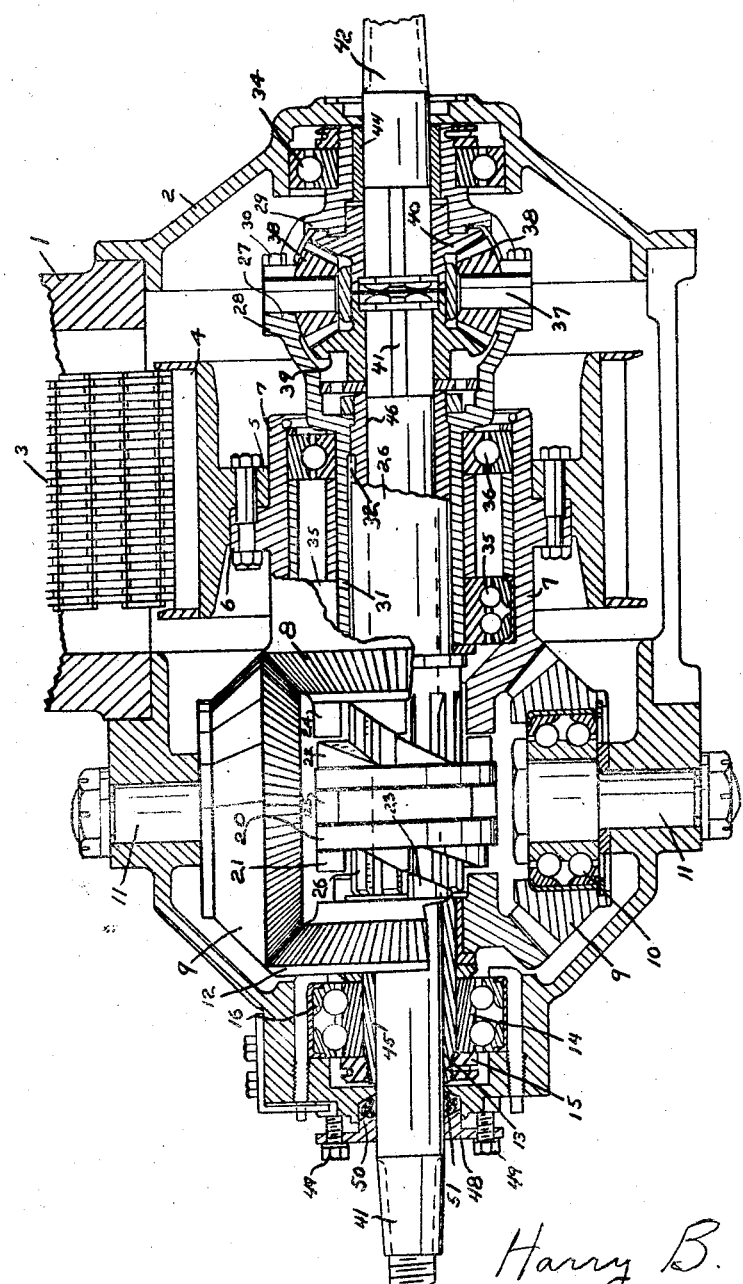
INVENTOR.
Harry B. Dodge
BY
Erwin, Wheeler & Woolard
ATTORNEYS Patented Sept. 8, 1925.

1,553,147

UNITED STATES PATENT OFFICE.

HARRY B. DODGE, OF CLINTONVILLE, WISCONSIN, ASSIGNOR TO FOUR WHEEL DRIVE AUTO COMPANY, OF CLINTONVILLE, WISCONSIN.

UNITARY REVERSING AND DIFFERENTIAL STRUCTURE.

Application filed September 26, 1923. Serial No. 664,848.

*To all whom it may concern:*

Be it known that I, HARRY B. DODGE, a citizen of the United States, residing at Clintonville, county of Waupaca and State of Wisconsin, have invented new and useful Improvements in Unitary Reversing and Differential Structures, of which the following is a specification.

This invention relates to improvements in unitary reversing and differential structures.

It is the primary object of this invention to produce a novel, compact, and substantial arrangement for associating reversing mechanism with a differential in the power transmission line leading thereto, whereby the driven elements of the differential may be actuated in either direction with proper differentiation at all of the speeds made available by the usual set of change speed gearing.

More particularly stated, it is my object to produce a compact device by associating a bevel gear reverse mechanism with a differential mechanism in such a way that some of the gears of the reverser and some of the gears of the differential will be co-axial with the driven elements of the differential, the reversing clutch being also co-axial therewith, whereby space is conserved and the parts are closely related. The manner in which the several rotative elements of the device are successively journaled in concentric manner, so far as is possible, will be more apparent hereinafter.

The drawing represents an embodiment of this invention, the mechanism being shown partly in axial section.

The particular structure herein disclosed is intended for use in a transmission mechanism such as is disclosed in Patent No. 1,219,529, issued to P. J. F. Batenburg, March 20, 1917, particular reference being made to Figure 2 of said patent. It may be stated briefly that Figure 2 of the Batenburg patent illustrates a transmission mechanism including a change speed mechanism and a differential device connected together through the medium of a chain belt. In the patented structure the reversing gearing is included in the change speed mechanism and constitutes a part of the transmission drive to the differential. Consequently, but one speed in reverse is possible. In the present device, it is contemplated that the reversing gearing be interposed in the drive between the change speed mechanism and the differential mechanism, thereby allowing the driven elements of the differential to be actuated at all speeds in either direction. I am aware that reversing devices have heretofore been inserted in transmission lines leading between change speed gearing and differential gearing, and the following disclosure will be understood, therefore, to be especially directed to the unusually compact and sturdy arrangement shown in the drawing and claimed herein. I do not desire to limit myself to the specific structure herein disclosed, inasmuch as the novel principle embodied therein may be incorporated in a variety of devices for accomplishing similar results. Furthermore, I wish to make it clear that I recognize the fact that my invention may be applied to other purposes than the association of a device of this character with such a transmission mechanism as is shown in the Batenburg patent above referred to.

A portion of the main transmission housing or casing for the change speed gearing is shown at 1. The housing 2 is connected therewith as indicated, and contains mechanism to which this invention is particularly directed and which will be termed, for the purpose of this description, a sub-transmission mechanism. The chain belt 3 corresponds to the belt 45 as shown in the above identified patent to Batenburg and is adapted to transmit power between the change speed gearing and the sub-transmission mechanism contained in housing 2.

The chain 3 drives a sprocket 4 which is connected by means of annular flange 5 with a corresponding flange 6 upon the sleeve-like hub 7 of the bevel gear 8. The bevel gear 8 meshes operatively with one or more transmission gears 9 which are supported for rotation, preferably upon anti-friction bearings 10, from the studs 11 carried by the casing element or housing 2. In axial alignment with bevel gear 8 is a gear 12 in operative mesh with the interposed bevel gears 9 and arranged thereby to receive power from bevel gear 8. A convenient mounting for gear 12 is provided by means of a tapered hub 13 for said gear upon which a race member 14 of an anti-friction bearing is confined by a nut 15. A complementary race device 16 is seated within a suitable recess in housing 2 in the manner clearly indicated in the drawing.

Gears 8 and 12, therefore, are interconnected through gears 9 for rotation in opposite directions and are both positively driven at all times when the chain belt 3 is in motion.

Arranged to receive power alternatively from either of gears 8 or 12 is co-axially disposed clutch element 20 provided with teeth 21 and 22 adapted respectively for operative engagement with clutch teeth 23 and 24 upon gears 12 and 8. The clutch element 20 is illustrated in a neutral position wherein it receives power from neither gear and can remain at rest during gear rotation. It will be understood, however, that if the clutch element 20 is moved axially in either direction by means of the usual clutch shifting fork, one end of which is shown at 25, said clutch element will be caused to rotate in a direction corresponding to that of the gear with which its teeth will be engaged.

Clutch element 20 is splined for axial sliding movement upon sleeve 26 which is co-axial with gears 8 and 12. Sleeve 26 terminates at one end immediately adjacent the face of gear 12 and extends to a point close to the differential mechanism hereinafter to be described. The driving casing 27 for the differential mechanism may conveniently comprise two parts 28 and 29 bolted together as indicated at 30. The casing portion 28 is provided with a sleeve-like extension 31 keyed by means of key 32 to the sleeve 26 which carries clutch element 20. Thus, casing 27 may be connected through sleeve 31, sleeve 26 and splined clutch element 20 with either of the bevel gears 8 or 12 for rotation in either direction.

Casing portion 29 is carried by the bearing 34 from housing 2, and inasmuch as the sleeve 31 of casing 27 is rigidly connected with portion 29 of said casing, and also with sleeve 26 thereof, it will be understood that these parts constitute a unit for rotation and support. Externally of sleeve 31 suitable bearing elements 35 and 36 carry the sleeve-like hub 7 of gear 8, whereby the gear and its hub and sprocket 4 can rotate freely and independently of sleeve 31 from which they are supported.

The differential device within casing 27 is of ordinary construction. Radially disposed studs 37 carried by casing 27 support the planetary pinions 38 which mesh with gears 39 and 40, disposed respectively upon the squared ends of shafts 41 and 42.

Shafts 41 and 42 constitute driven elements of the device in so far as this invention is concerned. Either shaft may be connected through universally jointed driving shafts with front and rear differentials of a four wheel drive vehicle in the manner indicated in the patent to Batenburg. Or shafts 41 and 42 may comprise the axle shafts of a vehicle. In any event, they will be understood to be differentially interconnected through the medium of gears 39, 38, and 40. When the load upon them is equal, gears 38 will not rotate and shafts 41 and 42 will rotate in unison with casing 27 according to the direction in which such casing is driven through the reversing clutch element 20.

Shaft 42 has a bearing within bushing 44 which is carried within the journaled part of differential casing portion 29. Shaft 41 has a bearing within the tapered hub 13 of gear 12 at 45 and has an extended bearing throughout the entire length of sleeve 26, as best illustrated at 46. It will be understood that shaft 41 extends clear through the device to the center of the differential mechanism, where its end abuts the end of shaft 42. The bearing of shaft 41 within sleeve 26 is so extended that the differential casing shaft 41 and the superimposed sleeve 26, gear 8, and sprocket 4 rotate in perfect alignment, the entire mechanism being carried by a bearing 34 at one end of housing 2 and by the duplex bearing including races 14 and 16 at the other end of said housing.

Packing devices may be used at both ends of the housing and may be constructed similarly to that shown at the left hand end thereof. A clamping plate 48, apertured to receive shaft 41, is held by cap screws 49 to the housing and carries a recessed pressure block portion 50 arranged to compress suitable packing 51 about shaft 41 in the usual manner.

The operation will be clear from the foregoing description, but it may be summarized as follows.

The chain 3 receives power from a change speed device and drives the sprocket 4 which is carried by the sleeve-like hub of gear 8. Gear 12 is interconnected with gear 8 for opposite rotation. The clutch element 20 is splined to sleeve 26 and may be engaged with either of gears 8 or 12 to rotate said sleeve in either direction. The sleeve drives other suitable differential mechanism and shaft elements 41 and 42. The direction of rotation of such elements will correspond to the position of the clutch member 20.

It will be observed that not only are gears 39 and 40 of the differential concentric with shafts 41 and 42 in the usual manner, but that sleeve 26, clutch element 20, gears 8 and 12, and sprocket 4 are also concentric to the driven shafts. The entire construction is such as to provide an unusually compact mechanism for the purpose described.

I claim:

1. In a device of the character described, the combination with a housing, of a bevel gear journaled for rotation in one end thereof, a casing journaled for rotation in the other end thereof in alignment with said bevel gear, a pair of driven shafts having their ends within said casing and journaled respectively within said gear and within said casing, a sleeve connected with said casing and rotatably mounted upon the shaft journaled within said gear, a second bevel gear mounted for rotation concentrically and externally of said sleeve and provided with a sprocket, an idler gear operatively connecting said first mentioned bevel gear and said second bevel gear for opposite rotation, and a clutch collar in splined relation to said sleeve and reciprocable for engagement alternatively with said first and second bevel gears.

2. In a device of the character described, the combination with a housing, of a bevel gear journaled for rotation in one end thereof, a casing journaled for rotation in the other end thereof in alignment with said bevel gear, a pair of driven shafts having their ends within said casing and journaled respectively within said gear and within said casing, a sleeve connected with said casing and rotatably mounted upon the shaft journaled within said gear, a second bevel gear mounted for rotation concentrically and externally of said sleeve and provided with a power receiving element, a third bevel gear operatively connecting said first mentioned bevel gear and said second bevel gear for opposite rotation, and a clutch collar in splined relation to said sleeve and reciprocable for engagement alternatively with said first and second bevel gears, together with differential gearing supported in part from said casing and interconnecting said shafts therein, whereby said shafts are differentially intergeared and may be actuated in either direction.

3. In a device of the character described, the combination with a pair of aligned shafts and a casing concentric therewith and enclosing the ends of said shafts, a differential gearing operatively interconnecting said shafts and supported in part from said casing, whereby said casing is adapted for the actuation of said shafts, a sleeve connected with said casing and extending axially of one of said shafts in bearing relation thereto, a clutch collar reciprocable in splined relation to said sleeve, a gear supported for rotation with respect to said last mentioned shaft and provided with a bearing therefor, a second gear supported for rotation with respect to said sleeve, means interconnecting said gears for opposite rotation, and an actuating rotor supported from one of said gears for the actuation thereof, said clutch collar being engageable alternately with either of said gears, whereby to transmit power from said rotor to said differentially interconnected shafts for their actuation in either direction.

4. In a device of the character described, the combination with a pair of shafts, of differential gearing interconnecting said shafts and including a driving rotor, a sleeve connected with said rotor and extending co-axially with one of said shafts, a reversing gear set including a pair of gears interconnected for opposite rotation and supported concentrically with said sleeve, a clutch in splined relation to said sleeve and adapted selectively for engagement with either of said gears, a hub connected with one of said gears and journaled exteriorly upon said sleeve, and a power operated toothed wheel mounted upon said hub intermediate said gears and a rotor of said differential gearing, whereby to provide compactly a reversing mechanism and differential gear set assembled concentrically with said driven shafts and provided centrally of the assembly with power receiving means.

5. In a device of the character described, the combination with a housing and a pair of axially aligned shafts projecting therefrom, of a differential gear set within said housing and including a driving rotor journaled in said housing, one of said shafts being supported in said rotor, a reversing gear set within said housing including a pair of gears concentric with one of said shafts and an idler interconnecting said gears for opposite rotation, one of said gears being journaled in said housing and one of said shafts being journaled within said last mentioned gear, and a sleeve extending from the rotor of said differential gear set in bearing relation to said last mentioned shaft and in bearing relation within the other gear of said reversing gear set.

6. In a device of the character described, the combination with a housing and a pair of driven shafts projecting therefrom in axial alignment, of a differential gear set co-axial with said shaft within said housing and operatively interconnecting said shafts for differentiation, said set including a rotor journaled at one of its ends in the housing and providing a bearing for the first of said shafts, a reversing gear set co-axial with the second of said shafts and including a pair of gears interconnected for opposite rotation, one of said gears being provided with a bearing in said housing and providing a bearing for the second of said shafts and the other of said gears having an axially extended hub journaled exteriorly upon said rotor, said rotor providing internally a bearing for the second of said shafts, and means for applying power to the extended hub of said last mentioned gear, said means being disposed concentrically in said housing and intermediate said reversing gear set and said differential gear set.

7. In a device of the character described, the combination with a housing, of a gear journaled in said housing upon one side thereof and a driving rotor for a differential gear set journaled in said housing upon the other side thereof, a driven shaft journaled within said gear and with said rotor, a second driven shaft in alignment with the first and journaled within said rotor, differential gearing operatively mounted within said rotor and interconnecting said shafts, a second gear operatively interconnected with said first mentioned gear for opposite rotation, said second gear being journaled exteriorly upon said rotor and supported by said rotor and said first mentioned shaft, and a clutch operable intermediate said gears in splined relation to said rotor, said clutch being adapted selectively to operate said rotor from either of said gears, whereby to drive said intergeared shafts in either direction.

8. In a device of the character described, the combination with a casing, of a driving rotor for a differential gear set having a bearing at one side of said casing, a gear aligned with said rotor and having a bearing in the opposite side of said casing, a first shaft projecting from said casing and extending thereacross with bearings in said gear and within said rotor, whereby to support the inner end of said rotor from the opposite side of the casing, a second shaft aligned with the first and terminating with said rotor, said second shaft having a bearing within the rotor, differential gearing within said rotor operatively connecting said shafts, a second gear mounted upon said rotor exteriorly of the portion in which said first mentioned shaft finds its bearing, studs carried by said casing and idler gears mounted upon said studs and intermeshing with said first and second gears, whereby to connect said gears for opposite rotation, a clutch in splined connection with said rotor and shiftable between said first and second gears whereby selectively to clutch either of said gears to said rotor, and a toothed member mounted upon said second mentioned gear in fixed relation thereto and adapted to receive a driving connection.

HARRY B. DODGE.